April 12, 1949.  E. C. THOMSON  2,466,751
PHOTOELECTRIC RELAY
Filed Nov. 1, 1946
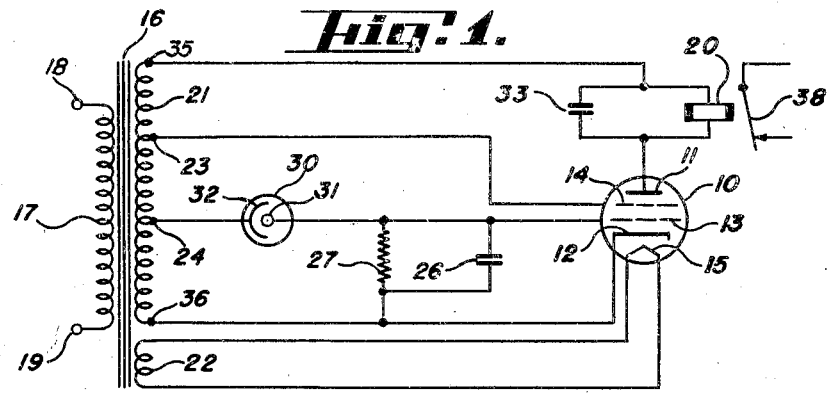
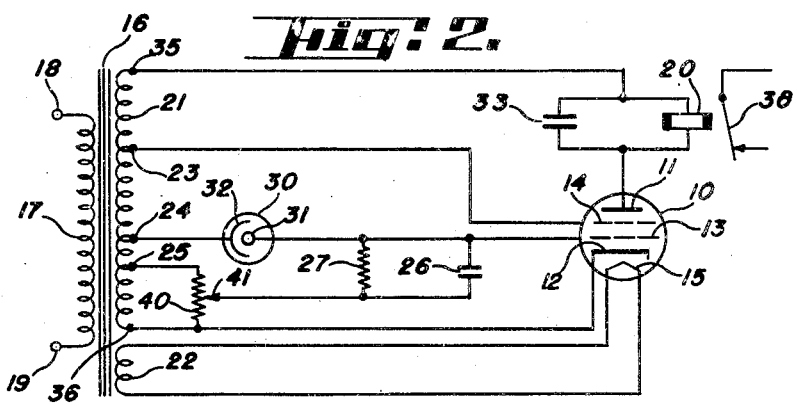
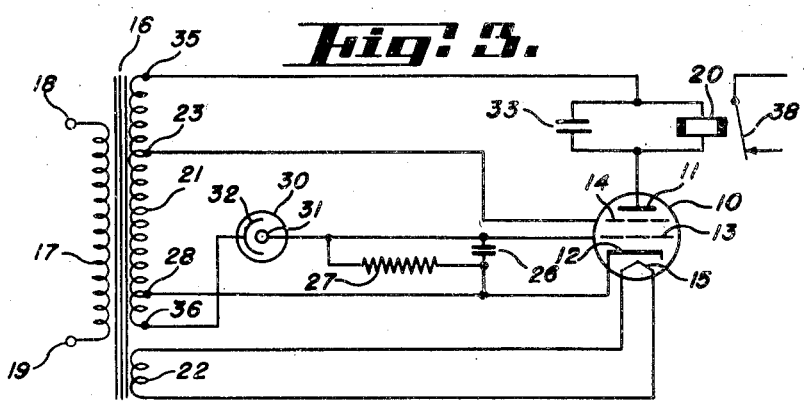
Inventor
E. CRAIG THOMSON
By James C. Hamilton
Attorney Patented Apr. 12, 1949

2,466,751

UNITED STATES PATENT OFFICE 2,466,751

PHOTOELECTRIC RELAY

Elihu Craig Thomson, Boston, Mass., assignor to Photoswitch, Incorporated, Cambridge, Mass., a corporation of Massachusetts Application November 1, 1946, Serial No. 707,272

13 Claims. (Cl. 250—41.5)

1

This invention relates in general to electrical relay circuits, and in particular to an improved electronic relay device for supervision and control of industrial processes in response to changes in a physical condition or the position of an object as detected by an element having current rectifying characteristics, such as a phototube.

The value of electronic relays as safety and control devices has been recognized for some time, particularly in the industrial field. Examples of uses of such devices, in which a phototube is the detecting circuit element, as industrial control devices are, the counting of objects on a conveyor, gauging of work in a lathe, motion initiating and limiting, and signalling generally. Photoelectrically actuated electronic relays hitherto used for these purposes, however, have been somewhat limited in their application because of the necessity of locating the phototube with or very close to other circuit components, or at least a first amplifier tube, in order to maintain maximum sensitivity and reliable operation. Considerations of space in many industrial applications render it difficult or even impossible to mount all or a substantial part of the control in a location on or very near to the machine being supervised, and for this reason, the advantages of photoelectric relays have not been fully utilized.

In such hitherto used electronic relays, the amplifying electronic relay circuit is responsive to changes in the conductivity of the detecting element. It is obvious that appreciable leakage of electric current between the leads or across the base of a detecting phototube increases its apparent conductivity, and may cause the circuit to act as if it were responding to an actuating condition. Since phototubes have a relatively high internal resistance, leakage of current in amounts comparable to the current passed by the phototube when conductive is likely to arise under normal industrial conditions from several causes. If a long cable is used to permit remote location of the phototube, and the device is supplied, as is usually the case, from an alternating current source, the distributed capacitance of the cable may introduce substantial leakage. The phototube base and socket may be exposed to moisture and dirt, which may form a conductive film over the surface. Also the interior of the phototube envelope eventually becomes coated with conductive material evaporated from the cathode, this process being greatly accelerated when the phototube is continually exposed to high ambient temperatures. Leakage due to one or more of these causes, or to any other cause

2 that permits a current of the same order of magnitude to be passed as that normally passed by the phototube when conductive, causes a false actuation of the controlled electronic circuit, and removes control from the detecting phototube. It is evidently desirable that controls of this type should be more reliable and adaptable than heretofore.

It is also desirable that a control of this type for industrial use be insensitive to momentary variations in the detected condition, so as to prevent false operation thereof. The control must, however, operate rapidly when a normal actuating condition occurs. For example, a photoelectrically actuated device used as an object counter must be unaffected by flickering of the source of light but must respond immediately to count objects as they pass through the light beam.

It is further desirable that when phototube illumination is changed, the resulting change in the phototube resistance as compared to the phototube fixed capacitance and that between the connecting leads shall not be effective to shift the phase of the control grid potential of the amplifying electronic circuit so as to cause erroneous action of that circuit. This has been a defect of some prior arrangements.

Furthermore, it is essential that a control relied on in an industrial process as a supervising device must be in itself reliable in operation. The device must preferably be so designed that it responds reliably to an operational signal under the most severe conditions, and may be used on any kind of power line, whether isolated therefrom or not.

It is accordingly the principal object of this invention to provide an electronic relay device which will give satisfactory and reliable operation under the severest conditions normally encountered in industrial applications. To this end, it is contemplated to take advantage of the rectifying characteristics of certain electrical circuit elements, such as phototubes, for detection purposes. The electronic circuit is so arranged as to operate a control when the direct current component across a detecting element attains a certain predeterminable value, and to be substantially unaffected by any reasonable amount of alternating current component that may be present.

Another object of the invention is to permit remote location of the phototube or equivalent device without appreciable sacrifice of sensitivity. To this end, the control circuit is so arranged that the effect of the capacitance between leads to the phototube is negligible for cables of such length as would be required in any practical installation.

Another object is to provide a control of the type described in which a detecting phototube may be remotely located from the remainder of the device at a vastly greater distance than those distances that would normally be required, without sacrifice of the reliability of the device.

Another object is to provide such a control which is insensitive to momentary fluctuations in the detected condition. To this end an inherent time delay of suitable magnitude is provided in the electronic relay circuit.

Still another object is to provide a circuit which is adaptable for use with various types of rectifying elements suitable for detecting changes in the condition to be supervised.

A further object is to provide a device, the sensitivity of which may be readily and accurately adjusted for various operating conditions, and which is stable to a high degree.

A still further object is to provide a device which requires only one electron discharge tube of a standard type in the amplifying electronic relay circuit, and a minimum of other electrical components.

Still another object is to provide such a control device which may be used on any type of power line, and need not be isolated therefrom to guarantee reliable action.

It is yet another object of the invention to provide such a control apparatus in which the distributed capacitance of the wiring and the various electron tubes, including that of a detecting phototube, is not effective to cause false actuation of the control when the illumination of the phototube is changed.

Other objects of the invention are the provision of apparatus of the type described which is simple in design and easy to manufacture, of low cost, small size and light weight.

These and other objects and features of the invention will become apparent from the description that follows. This description refers to the drawing in which:

Fig. 1 illustrates in electrical scheme a circuit in accordance with the invention;

Fig. 2 illustrates apparatus like that of Fig. 1 modified to include a sensitivity control; and Fig. 3 illustrates in electrical scheme another circuit in accordance with the invention, having an alternative detecting phototube connection.

For the purposes of illustration a tetrode is shown throughout as the single electron discharge tube of the amplifying relay circuit, but it will be understood that other types of tubes, as for example a triode, may be used.

In Fig. 1, the relay electron discharge tube 10, of the tetrode type, having an anode 11, a cathode 12, a control grid 13, a screen grid 14, and a cathode heater 15, is adapted to be connected at the anode and cathode to a source of power through a suitable transformer 16. The transformer has a primary winding 17, adapted for connection to an alternating current power source at a pair of input terminals 18 and 19, and a high voltage secondary winding 21 to the ends 35 and 36 of which the anode 11 and cathode 12 are respectively connected. A low voltage secondary winding 22 energizes the heater 15. An electromagnetic relay device 20 is connected in the anode-cathode circuit of the relay tube 10, here in the connection from the high voltage secondary winding 21 to the anode 11. When deenergized, the relay 20 performs the desired industrial operation, as for example that of actuating a counter, (not shown), by closing a switch 38. The switch 38 is held open by the relay 20 when energized by current flowing in the anode cathode circuit of the relay tube 10.

The screen grid 14 is connected to any suitable point 23, on the high voltage secondary winding 21, near the anode end 35 thereof. When the electron tube 10 of the relay is a triode, this connection is omitted.

The control grid 13 is connected to the high voltage secondary winding 21, at the cathode end 36 thereof. A resistor 27 is connected in series in this connection, and a capacitor 26 is connected in parallel with resistor 27 for the purpose of providing an A. C. filter around the resistor, and maintaining a substantially steady voltage thereacross, as will be explained below.

A phototube 30, having an anode 31 and cathode 32, is connected at its anode to the control grid 13, and at its cathode to a point 24 on the high-voltage secondary winding between the control grid (cathode) connection point 36 and the screen-grid connection point 23.

The intermediate connections 23 and 24 to the high voltage secondary winding 21 may be varied as appropriate to secure desired operating characteristics of the apparatus. A smoothing capacitor 33 is provided in parallel with the relay 20.

The apparatus illustrated in Fig. 1 is operated as follows:

With alternating voltage applied at the input terminals 18 and 19, the anode 11 of the relay electron tube 10 is positive with relation to the cathode 12 during one-half of each alternating current cycle, this half-cycle being termed the "positive half-cycle." If the phototube 30 is not illuminated, the phototube is substantially non-conductive in both directions. The control grid 13 has zero bias with respect to the cathode 12, due to the fact that the control grid and cathode 12 are connected to the same point 36 on the high voltage secondary winding 21, and the electron tube 10 is therefore conductive. The relay 20 is then energized. During conductivity of the tube 10, no grid current flows in the circuit of the control grid 13, since the grid is at the same potential as the cathode 12. The electron tube 10 remains conductive as long as the phototube 30 is not illuminated. During the other or "negative" half-cycle of the alternating current, the smoothing capacitor 33 maintains the relay 20 energized.

When the phototube 30 is illuminated, electrons may flow from its cathode 32 to its anode 31, but substantially no electrons can flow in the reverse direction. The phototube cathode connection point 24 is negative with respect to the phototube anode connection point 36 during the negative half-cycle of the alternating current (when the relay electron tube is normally non-conductive), and electrons flow during this half cycle from the phototube cathode 32 to the anode 31 charging the capacitor 26 negatively on the side nearer the control grid 13 and, after a number of cycles have passed, the resulting negative charge reduces the potential of that grid sufficiently to cut off the flow of current in the relay electron tube 10 and deenergize the electromagnetic relay 20. Some of the electrons flow through the resistor 27. In another sense, it may be said that, when the capacitor 26 is fully charged, it provides a D. C. potential across the resistor 27 by discharging part of its charge through that resistor during the half cycle when the phototube 30 is non-conductive (the aforementioned positive half cycle). This D. C. potential renders the control grid 13 sufficiently negative with respect to the relay tube cathode 12 to deenergize the relay 20. The accumulation of charges in the capacitor 26 when the phototube 30 is conductive is, of course, more rapid than it can be drained off by the resistor 27.

It is not necessary that the electron tube 10 be completely cut off when the phototube 30 is illuminated. The anode-cathode current in the tube 10 need only be reduced to such a value that the relay 20 permits the switch 38 to close. This value is determined by the characteristics of the relay 20 and of the associated switch elements, and may be arrived at by proper adjustment of either or both of the phototube and control grid connections to the high voltage secondary winding.

The circuit of Fig. 2 is like that of Fig. 1 except that a sensitivity control has been added. This control consists of a potentiometer 40 connected at its ends to the relay tube cathode connection point 36 and an adjacent point 25 on the high voltage secondary winding 21. The relay tube control grid 13 is now connected to the movable tap 41 of the potentiometer 40.

Movement of the potentiometer tap 41 adjusts the amount of positive bias on the control grid 13 with respect to the relay tube cathode 12 and hence determines the amount of current which must be furnished by the phototube 30 to the grid capacitor 26 to maintain the negative charge thereon that is required to deenergize the relay 20, when the phototube is illuminated. If the positive bias is high, a relatively large amount of current must be furnished, and the response to illumination is thus retarded. This is a condition of low sensitivity. If the positive bias is low, as when the potentiometer tap 41 is nearer to the lower tap 36 than to the upper tap 25, the amount of negative current required to be furnished to maintain the negative charge on the capacitor 26 required to deenergize the relay 20 is reduced, so that the response to illumination of the phototube 30 is more rapid. This is a condition of high sensitivity, in which the circuit responds to a relatively low amount of absolute light on the phototube. Thus, the phototube 30 must supply a greater and greater charge to the condenser 26 during each negative half cycle as the grid bias is increased, in order to maintain the control grid 13 more negative than the cathode.

When the phototube 30 is non-conductive, the condenser 26 will be caused to charge on positive-grid half cycles in such a direction as to neutralize the bias, that is, negative on the grid side. This phenomenon has no effect on the conductivity of the tube, and ceases just as soon as the grid is maintained slightly negative with respect to the cathode. It results in there being an initial charge on the grid condenser, however, which causes a discharge current through the resistor 27, proportional to the bias. The phototube 30 must supply this discharge current before it can cause the grid to go negative. Thus the bias is equally effective in reducing the sensitivity as if grid rectification did not occur.

The apparatus shown in Fig. 3 is like in nearly all respects to that of Fig. 1 except that here the relay tube cathode 12 and control grid 13 are connected to the high voltage secondary winding 21 at a tap 28 that is near the lower or former cathode end 36 of the winding, and the phototube cathode 32 is connected to that lower end 36 of the winding, in their place. This change in connections alters the operating characteristics of the circuit. The phototube, when illuminated, now becomes conductive to charge the grid capacitor 26 toward cut-off during the positive half cycle rather than the negative half cycle of the alternating current as in the circuit of Fig. 1. Phototube voltage is supplied by the section of secondary winding 21 contained between the cathode connection point 28 and the lower end 36 thereof.

The invention as shown in all the figures may have the advantage that it does not respond to momentary flickering of the light illuminating the phototube 30, since the grid capacitor 26 ordinarily requires a number of cycles of the alternating current to acquire sufficient charge to deenergize the relay 20. Of course, this capacitor may be made large for slow action or small for quick action as desired. If the capacitor 26 becomes charged too rapidly, the device will respond to momentary flickering of the controlling light. Accordingly, the magnitude of the grid capacitor 26 is preferably chosen so that such momentary flickering does not actuate the device.

The grid capacitor 26 functions also to minimize the effect of leakage of alternating current around the phototube through the distributed capacitance of the connection cable, which is effectively in parallel with the phototube. In normal operation, the charge accumulated on the capacitor 26 provides a relatively steady voltage in the discharge or grid resistor 27, which controls the potential on the control grid 13 with respect to that of the cathode 12. Since the phototube 30 is a rectifier, it maintains this as a unidirectional voltage, the capacitor 26 operating to smooth out the rectification ripple. With the phototube 30 located at or within two or three feet of the remainder of the apparatus, as is done with prior art devices, the connecting leads have such a small distributed capacitance that the impedance to the leakage of alternating current around the phototube is relatively very high, and the amount of alternating current that flows in the grid resistor 27 as a consequence of such leakage is so small that the voltage it generates in the resistor 27 is negligible by comparison with the aforementioned steady voltage. However, as the phototube is removed to a greater distance, for example eight or ten feet, from the remainder of the apparatus, this distributed capacitance grows in magnitude accordingly, providing a correspondingly smaller impedance to the flow of alternating current around the phototube 30, or, as it is commonly termed, a greater amount of "A. C. leakage." The leakage A. C. voltage generated in the grid resistor 27 as a consequence of the leakage alternating current may now assume a sizeable magnitude with respect to the aforementioned steady voltage. This leakage A. C. grid voltage is added to any normal grid bias voltage that may be present. In embodiments of the invention like those of Figs. 1 and 2, the addition is such that the total control grid voltage tends toward maintaining the relay tube 10 conductive, and in other embodiments like that shown in Fig. 3, where the phase of the leakage A. C. voltage is reversed, the effect of the addition is to drive the control grid voltage toward the cut-off value. In prior art devices, this effect has constituted a defect, limiting the distance from the remainder of the circuit at which the phototube may be operated without loss of reliability and stability of the device, for it has introduced erratic operation of the electronic amplifier circuit. In the present invention, the capacitor 26 by-passes the major portion of this leakage A. C. grid voltage, so that the stability and reliability of the device are not affected by A. C. leakage in the phototube leads. The grid resistor 27 is ordinarily chosen to have a relatively large value, of the order of 10 megohms. Where 60 cycle alternating current power is used, as is common, the capacitor 26 may have a value of 0.005 microfarad, and its impedance to 60-cycle alternating current is then about 0.5 megohm. This provides in effect, a short circuit around the resistor 27 for the leakage 60-cycle alternating current, so that very little leakage alternating current flows in the grid resistor, and the stability and reliability of the device are not disturbed.

As a matter of fact, the phototube 30 may, with the present invention, be located a tremendous distance, for example even one mile, from the remainder of the circuit, and still the reliability and stability of the circuit will not be affected. To counter-balance the great increase in capacitance that would be provided across the phototube by the connecting cable, the size of the capacitor 26 should be increased, for with the impedance to the flow of leakage A. C. around the phototube greatly lowered, the impedance to the flow of the same leakage A. C. around the resistor 27 must also be correspondingly lowered. This results in a greater delay in the action of the circuit, for, as mentioned above, the speed of action of the circuit decreases if the capacitor 26 is made larger. Thus, if a loss of speed of response can be tolerated, the invention provides reliable relaying action regardless of the distance from the remainder of the circuit at which the phototube is operated.

It is obvious that a reasonable amount of leakage around the phototube due to moisture on the mounting socket, or through the phototube due to normal gradual deterioration thereof may in the same fashion be tolerated by circuits according to the invention, and therefore that the device can be used under more severe moisture and dirt conditions than has heretofore been possible, and that the useful life of a phototube used with this invention is now longer than has been possible with prior devices.

For the same reason that it acts satisfactorily in the presence of A. C. leakage in the phototube leads, the invention also operates satisfactorily when it is not isolated from the power lines. In prior art circuits of the present kind such isolation is necessary because, when the housing of the relay is grounded, as is customary, there may be considerable capacitance between the lead from the grid 13 to the phototube and ground, and stray alternating voltages may be electrostatically induced through this capacitance into the grid-to-cathode impedance (resistor 27), and hence between the grid 13 and cathode 12, and can cause faulty operation as set forth above. But, with the present invention, these stray voltages, being always alternating, are substantially by-passed by the capacitor 26, and have only negligible effect on the device.

Although there may be some phase-shift in the control grid potential when the phototube is illuminated, this is of no consequence in the circuit of the invention, because the capacitor 26 stores some charge during each half cycle when the phototube is conductive, and eventually the relay tube 10 is cut-off as intended.

Many other modifications of the invention will suggest themselves to those skilled in the art, and therefore it is intended that the above description be interpreted as illustrative only and not in a limiting sense, and that the invention shall be limited only by the prior art and the spirit of the appended claims.

What is claimed is:

1. Electric relay apparatus comprising: an electron discharge device having an anode, a cathode, and a control electrode; means for energizing the anode-cathode circuit of said device, said control electrode being connected to said energizing means at a potential level normally to permit current to flow in said circuit; a capacitor connected in the circuit of said control electrode, and a resistor in parallel with said capacitor; a connection, which is substantially non-phase-shifting between said energizing means and the side of said capacitor furthest from said control electrode; and rectifier means energized from said energizing means for applying substantially a cut-off potential to the side of said capacitor nearest said control electrode in response to a controlling phenomenon.

2. Electric relay apparatus comprising: an electron discharge device having an anode, a cathode, and a control electrode; means for energizing the anode-cathode circuit of said device, said control electrode being connected to said energizing means at a potential level normally to permit current to flow in said circuit; a capacitor connected in the circuit of said control electrode, and a resistor in parallel with said capacitor; a connection, which is substantially non-phase-shifting between said energizing means and the side of said capacitor furthest from said control electrode; and a phototube energized from said energizing means for applying substantially a cut-off potential to the side of said capacitor nearest said control electrode in response to light impinging on said phototube.

3. Electric relay apparatus comprising: an electron discharge device having an anode, a cathode, and a control electrode; means for energizing the anode-cathode circuit of said device; operator means in said circuit; said control electrode being connected to said energizing means at a potential level normally to permit current to flow in said circuit and maintain said operator means energized; a capacitor connected in the circuit of said control electrode, and a resistor in parallel with said capacitor; a connection from the side of said capacitor furthest from said control electrode to a point on said energizing means, the voltage of which is in phase with the voltage of said anode; and a phototube energized from said energizing means for applying to the side of said capacitor nearest said control electrode a potential sufficiently negative to cause deenergization of said operator means in response to light impinging on said phototube.

4. Electric relay apparatus comprising: an electron discharge device having an anode, a cathode and a control electrode; a source of voltage connected at one end to said anode and at the other end to said cathode; a connection from said control electrode to a point on said source intermediate said ends, a capacitor in said connection, and a resistor in parallel with said capacitor; the connection between said source and the side of said capacitor furthest from said control electrode being substantially non-phase-shifting; and rectifier means energized from said source for applying substantially a cut-off potential to the side of said capacitor nearest said control electrode in response to a controlling phenomenon.

5. Electric relay apparatus comprising: an electron discharge device having an anode, a cathode, and a control electrode; a source of voltage connected at one end to said anode and at the other end to said cathode; a connection from said control electrode to a first point on said source intermediate said ends, a capacitor in said connection, and a resistor in parallel with said capacitor; the connection between said source and the side of said capacitor furthest from said control electrode being substantially non-phase-shifting; and a phototube connected at its anode to said control electrode and at its cathode to a second point on said source intermediate said ends.

6. Electric relay apparatus comprising: an electron discharge device having an anode, a cathode, and a control electrode; a source of voltage connected at one end to said anode and at a point near the other end to said cathode; a connection from said control electrode to said cathode, a capacitor in said connection, and a resistor in parallel with said capacitor; the connection between said source and the side of said capacitor furthest from said control electrode being substantially non-phase-shifting; and a phototube connected at its anode to said control electrode and at its cathode to the other end of said source.

7. Electric relay apparatus comprising: an electron discharge device having an anode, a cathode, and a control electrode; a source of voltage connected at one end to said anode and at the other end to said cathode; a substantially purely resistive voltage apportioning device connected from the cathode to a point on said source intermediate said ends and having a movable tap for selecting a voltage therefrom, a connection from said control electrode to said tap, a capacitor in said connection, and a resistor in parallel with said capacitor; and rectifier means energized from said source for applying substantially a cut-off potential to the side of said capacitor nearest said control electrode in response to a controlling phenomenon.

8. Electric relay apparatus comprising: an electron discharge device having an anode, a cathode, and a control electrode; a source of voltage connected at one end to said anode and at the other end to said cathode; a substantially purely resistive voltage apportioning device connected from the cathode to a point on said source intermediate said ends and having a movable tap for selecting a voltage therefrom, a connection from said control electrode to said tap, a capacitor in said connection, and a resistor in parallel with said capacitor; and a phototube connected at its anode to said control electrode and at its cathode to a point on said source other than that to which said control electrode is connected.

9. Electric relay apparatus comprising: an electron discharge device having an anode, a cathode, and a control electrode; a transformer adapted for energization by alternating current and having a secondary winding, connected at one end to said anode and at the other end to said cathode; a connection from said control electrode to the cathode end of said winding, a capacitor in said connection, and a resistor in parallel with said capacitor; the connection between said winding and the side of said capacitor furthest from said control electrode being substantially non-phase-shifting; and a phototube connected at its anode to said control electrode and at its cathode to a point on said winding intermediate the ends thereof.

10. Electric relay apparatus comprising: an electron discharge device having an anode, a cathode, and a control electrode; a transformer adapted for energization by alternating current and having a secondary winding, connected at one end to said anode and at the other end to said cathode; a potentiometer, having a movable tap, connected at one end directly to the cathode end of said winding and at the other end to a first point on said winding near the cathode end thereof; a connection from said control electrode to said tap, a capacitor in said connection, and a resistor in parallel with said capacitor; and a phototube connected at its anode to said control electrode and at its cathode to a second point on said winding intermediate said first point and the anode end thereof.

11. Electric relay apparatus comprising: an electron discharge device having an anode, a cathode, and a control electrode; a transformer adapted for energization by alternating current and having a secondary winding, connected at one end to said anode and at the other end to said cathode; relay means including a magnet coil in the anode-cathode circuit; a potentiometer, having a movable tap, connected at one end to the cathode end of said winding and at the other end directly to a first point on said winding near said cathode end; a connection from said control electrode to said tap, a capacitor in said connection, and a resistor in parallel with said capacitor; and a phototube connected at its anode to said control electrode and at its cathode to a second point on said winding intermediate said first point and the anode end thereof.

12. Electric relay apparatus comprising an electron discharge device having an anode, a cathode, and a control electrode; a transformer adapted for energization by alternating current and having a secondary winding, connected at one end to said anode and at a first point near the other end to said cathode; a connection from said control electrode to said first point, a capacitor in said connection, and resistor in parallel with said capacitor; and a phototube connected at its anode to said control electrode and at its cathode to said other end of said winding.

13. Apparatus in accordance with claim 9 in which: said capacitor provides substantially a shunt around said resistor for voltages varying at a rate of substantially sixty or more cycles per second applied thereacross, whereby a substantially unidirectional voltage of controlled magnitude is produced across said resistor and capacitor by said phototube when illuminated.

E. CRAIG THOMSON.

REFERENCES CITED

The following references are of record in the file of this patent:

UNITED STATES PATENTS

| Number | Name | Date |
| --- | --- | --- |
| 2,248,611 | Cockrell | July 8, 1941 |
| 2,252,457 | Cockrell | Aug. 12, 1941 |